United States Patent Office 3,245,147
Patented Apr. 12, 1966

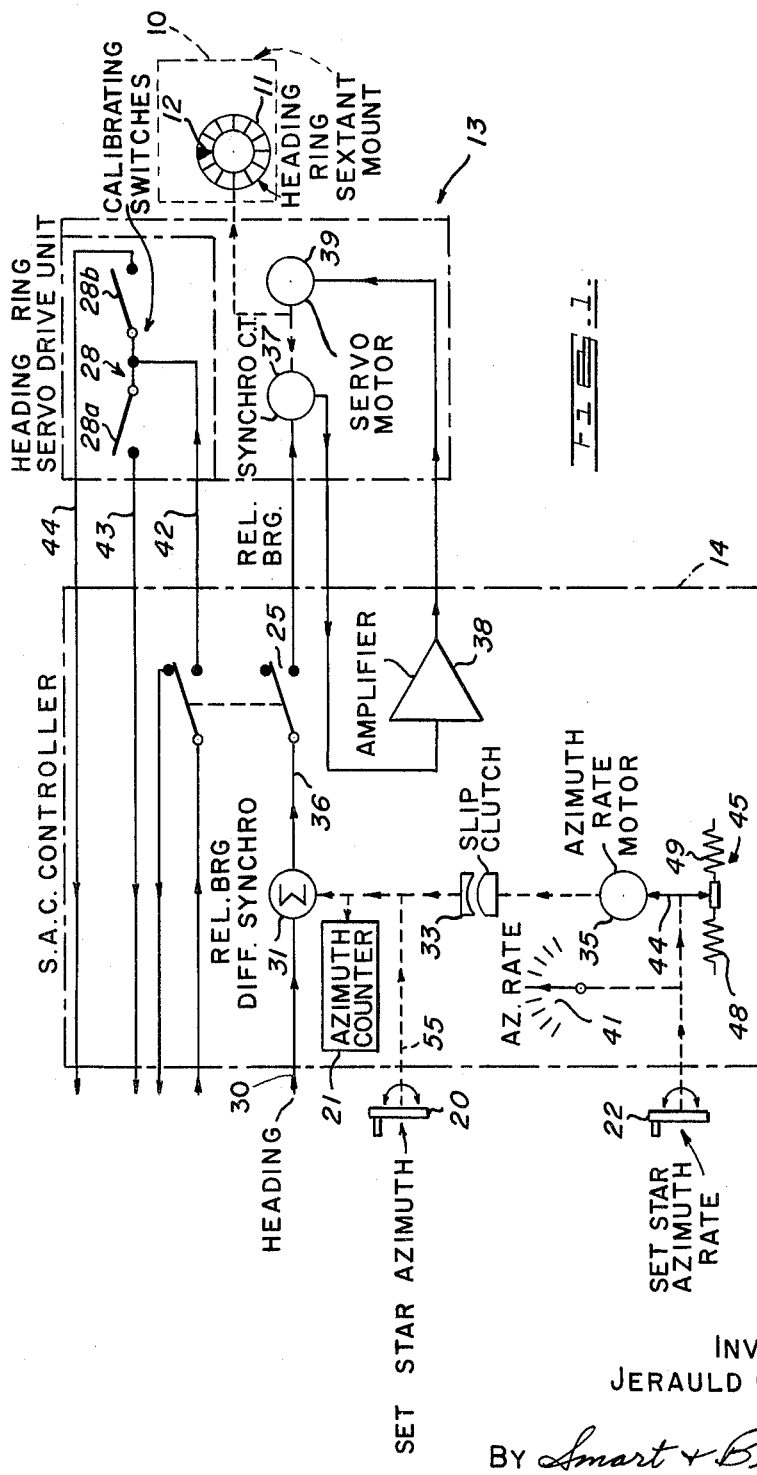

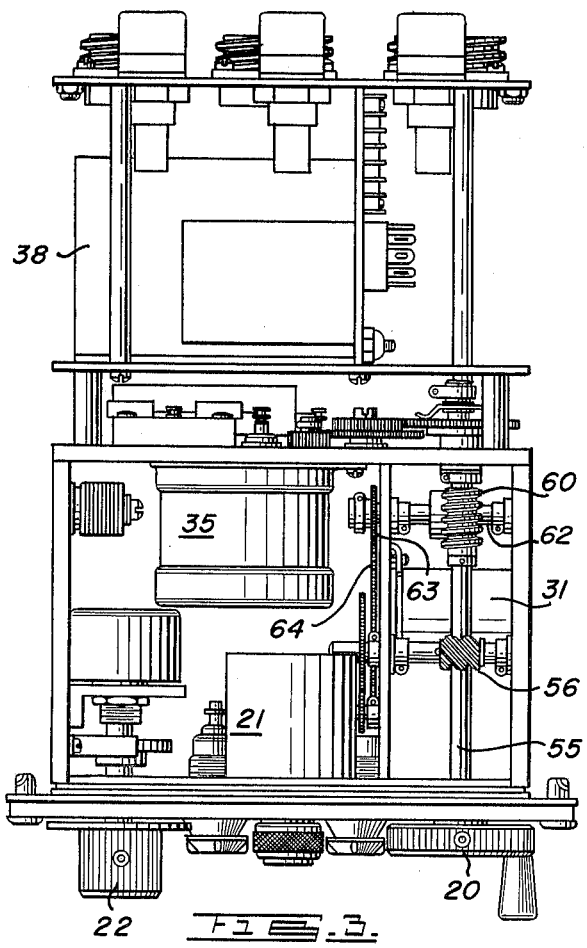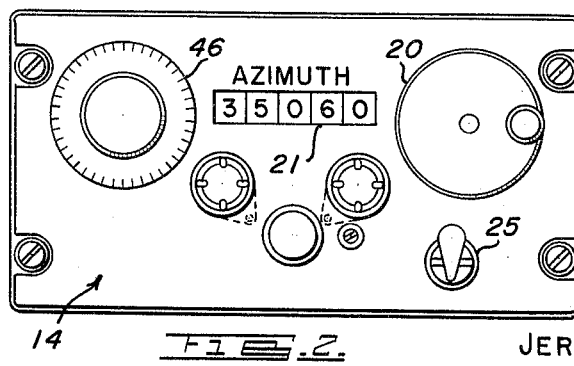

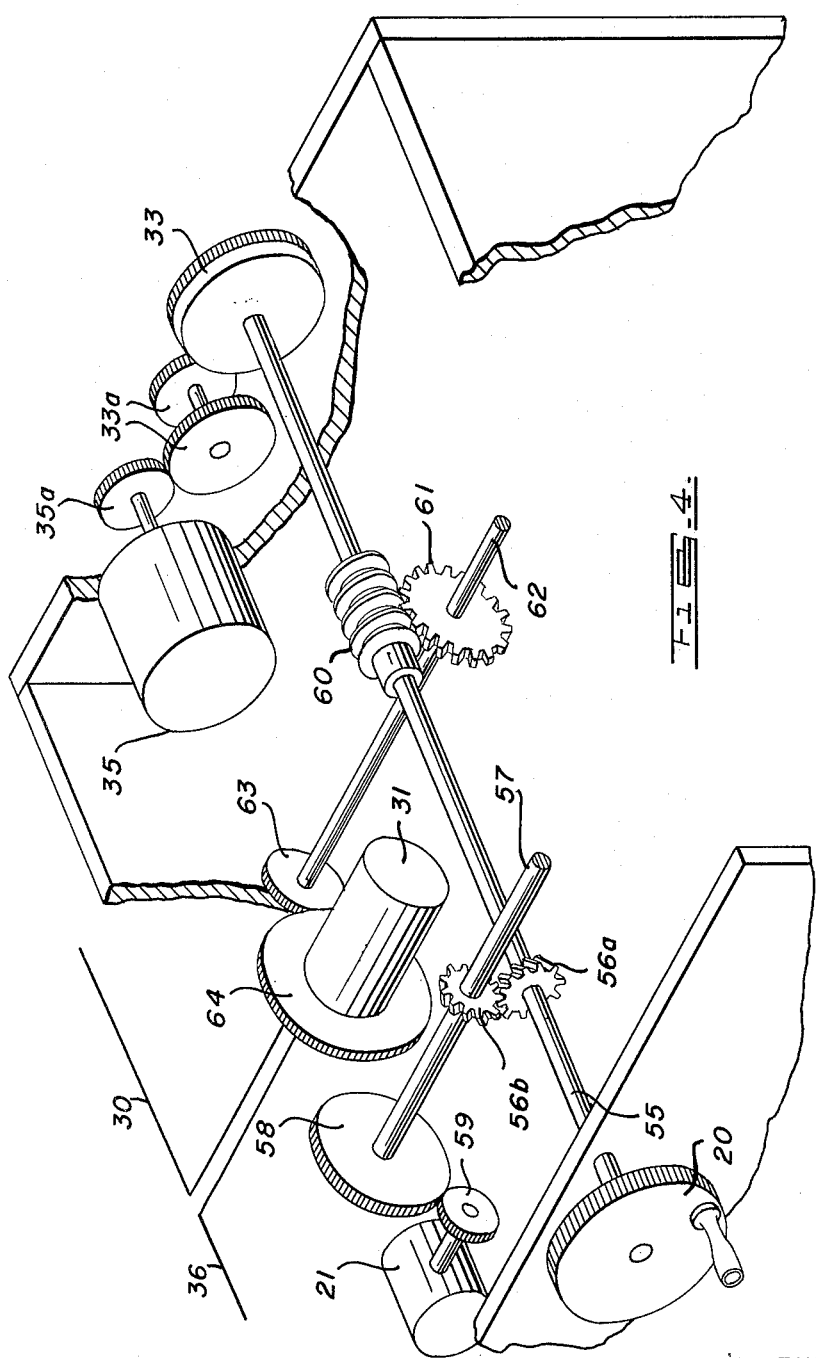

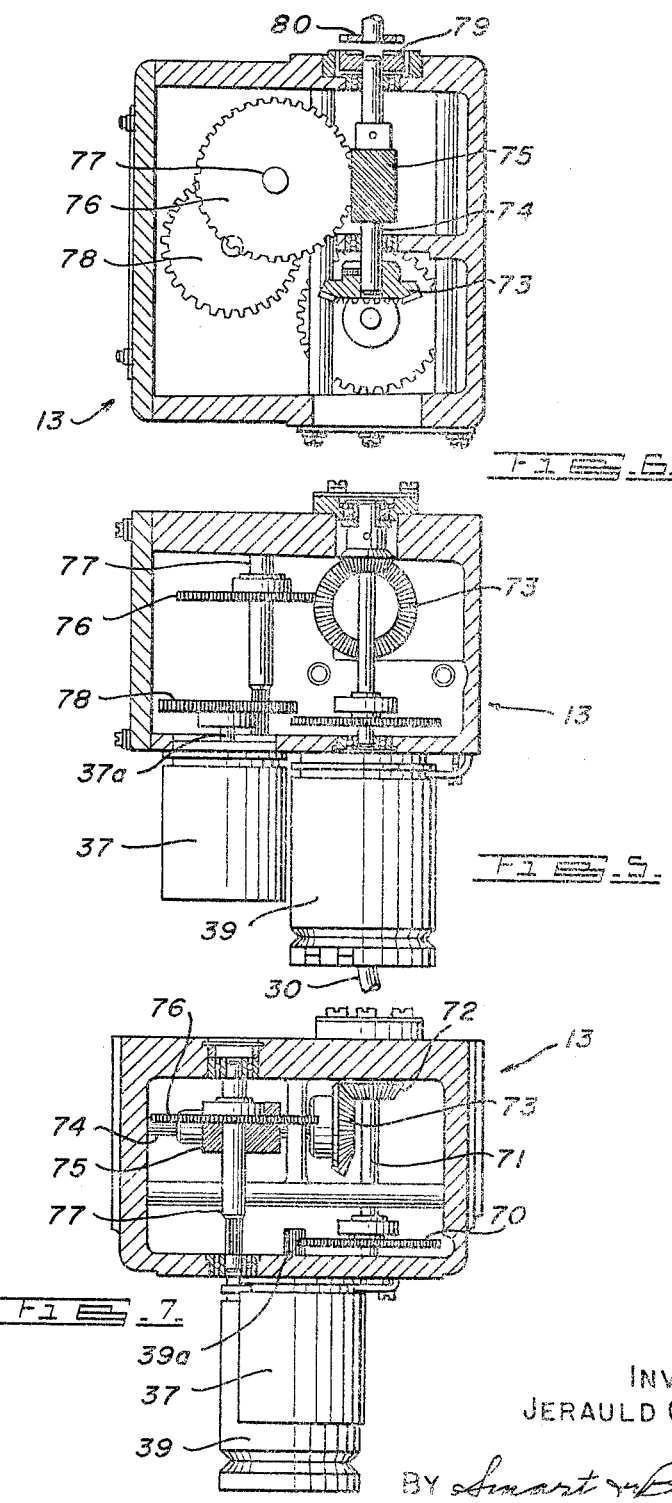

3,245,147
CALIBRATING HEADING SYSTEMS
Jerauld George Wright, Dartmouth, Nova Scotia, Canada, assignor to Her Majesty the Queen in right of Canada as represented by the Minister of National Defence
Filed Feb. 13, 1961, Ser. No. 88,907
Claims priority, application Canada, Feb. 15, 1960, 792,517
8 Claims. (Cl. 33—61)

This invention relates to a method and apparatus for calibrating or correcting an aircraft heading system by means of a visual sight on a celestial body.

The standard procedure currently in use for calibrating or correcting heading systems, usually a compass, in aircraft, or a heading system which uses the compass as a source of reference, is to make a sight on a star or other celestial body, obtaining from this sight the relative bearing of the celestial body in question from the aircraft heading and then by means of tables relating the star azimuth with the correct heading, any discrepancy being attributed to a misalignment of the heading system.

The standard method suffers from the disadvantage that the navigator, when making the star sight, is not at the instant of making the sight aware of the actual instantaneous heading of the aircraft. By means of the intercommunication system in the aircraft the navigator will normally request of the pilot, or another crew member, information with respect to heading at the time of making the sight, but this involves a certain delay and the element of human error with the consequence that a really accurate sight is unattainable. Thus the compass correction could in certain instances lead to the compass being over or under corrected so that whilst a certain correction can be made which would probably reduce any existing error, the correction may not be sufficiently fine to produce a thoroughly dependable compass calibration.

It must also be borne in mind that the navigator will make a number of sights on the same star over a period of time to obtain an average bearing value and that a rate correction must be made for the alteration of star azimuth during the elapsed period of making the sights. This factor introduces another source of error which is compounded with the drawbacks previously mentioned, with the net result that the compass correction may on occasion be far from accurate.

In very northern latitudes where a magnetic compass cannot be used accurately, it is necessary to navigate an aircraft using a directional gyroscopic compass as a directional reference element for its navigational system. The procedure outlined above may be followed to enable the navigator to calibrate his compass to true north or to detect so called "gyro drift." The same drawbacks are of course present here as before.

It is an object of the present invention to provide a method and apparatus for calibrating an aircraft heading system to a celestial reference by means of a celestial sight, which method and apparatus avoids or reduces the source of error heretofore mentioned.

According to the present invention a method of calibrating a heading system to a celestial reference comprises utilizing an output analogue signal from the heading system to be corrected to produce an assumed heading reference analogue as a first input to a computer (this output analogue signal will, of course, be relative to a chosen reference e.g. geographically True North and will be "assumed" since in the absence of evidence to the contrary, the navigator will assume his compass heading to be correct), setting into the computer as a second input the analogue (computed from craft position and stored data) of the azimuth of a celestial body on which a sight is to be made (of course the analogue will be relative to the same reference, in this instance True North, furthermore, this second analogue will be expressed in a form which will be compatible with the first analogue for the purpose of computation); subtracting algebraically in the computer the analogue of assumed heading and the analogue of celestial body azimuth whereby to produce the analogue of an assumed relative bearing of the celestial body to the aircraft; applying this analogue of assumed relative bearing as an error signal to a feed back servo loop whereby to cause a servo motor to drive a heading ring of a sextant which is notched or otherwise indexed on the surface of the ring mount to align a zero reference with the assumed relative bearing of the said celestial body; making a sight on the celestial body by means of a sextant mounted in the sextant mount and movable independently of the heading ring; and operating calibrating switch means to adjust the heading system until said celestial body and said zero reference on the indexed heading ring are aligned optically thereby correcting said heading system.

According to a feature of the present invention a method of calibrating a navigational system to a celestial reference comprises generating a compass output analogue signal corresponding to an assumed true heading; generating a compatible analogue of calculated azimuth of a selected celestial reference body; generating an analogue, compatible with the first and second mentioned analogues, of the rate of change of celestial body azimuth, algebraically subtracting the first two mentioned analogues and adding the third mentioned analogue whereby to produce as a further analogue signal, the analogue signal of assumed relative bearing of said celestial body to said aircraft, which further analogue signal is continuously corrected for the rate of change of celestial body azimuth; driving an indexed sextant mount heading ring in response to said further analogue signal to a constantly corrected position corresponding to said assumed relative bearing; manually aligning the said sextant with the actual bearing of said selected celestial reference body independently of the heading ring; and altering the calibration of the navigational system to move said indexed heading ring into optical alignment with said celestial reference body, whereby said first mentioned analogue becomes the analogue of the true heading of the aircraft with respect to said celestial reference body, thereby calibrating said navigational system.

The present invention also provides apparatus, for cooperation with a sextant and a sextant mount having a zero indexed heading ring, for calibrating an aircraft heading system including a directional reference element and means for generating an analogue signal of assumed aircraft heading, which apparatus comprises differential means adapted to receive as a first input the analogue signal of assumed aircraft heading; means for setting into the differential means as a second input the analogue of the computed azimuth of a selected celestial body; a feed back servo loop including a servo motor adapted to drive said zero indexed heading ring in response to an output analogue signal from said differential means; and calibrating switch means operable to alter the calibration of said directional element to align optically said celestial body and the zero index on said heading ring thereby correcting the said compass system.

According to a further feature of the present invention there is provided means for setting into the differential means as a third input the analogue of the rate of change of azimuth of the selected celestial body.

The following is a description by way of example of one embodiment of the present invention, reference being made to the accompanying drawings in which:

FIGURE 1 is a diagrammatic representation of the information flow in the apparatus according to the present invention;

FIGURE 2 is a front elevational view of the instrument as mounted at the navigator's station in an aircraft;

FIGURE 3 is a plan view of the instrument as illustrated in FIGURE 2;

FIGURE 4 is a detail;

FIGURE 5 is a sectional elevation of a sextant mount servo drive unit;

FIGURE 6 is a sectional top plan view of the unit illustrated in FIGURE 5, and

FIGURE 7 is a side sectional elevation of that unit.

The present invention is intended for use with an aircraft heading system such as a compass reference element (say a gyroscopic or gyromagnetic compass) capable of generating a direct analogue of aircraft heading or a compass reference element in association with an intermediate device which utilizes an output signal from the compass to generate an analogue of aircraft heading in degrees true (or any other chosen reference). Such a device is described in my copending appliction Serial No. 88,905, filed Feb. 13, 1961, now Patent Number 3,062,437, issued Nov. 6, 1962. The apparatus of the present invention is used in cooperation with a sextant mount 10 of the type which receives a periscopic sextant and has a heading ring 11 on which a zero reference 12 is marked. The heading ring servo drive unit 13 of the present invention is attached to the sextant mount and the controller box 14 of the present invention is intended to be located remotely from the sextant mount. The sextant and sextant mount per se form no part of the present invention. An example of a sextant mount suitable for cooperation with the apparatus of the present invention is the Kollsman type No. 1708–01. Such sextant mount and periscopic sextant are well known in themselves and thus will not be described in detail beyond stating that the mount is arranged in fixed condition on the aircraft cabin roof in such a manner as to pass the sextant periscope tube so that it may be extended beyond, and retracted within the aircraft's outer skin and carries a heading ring, coaxial with the tube, and drivable relative to the mount. The heading ring is rotatable both with respect to the sextant mount and with respect to the independently rotatable sextant. The sextant which is movable within the mount, has an optical system for projecting the relevant portion of the heading ring so that the index can be brought into view in the sextant eyepiece. This sextant and its mount are described in detail in the Kollsman information manual on precision aircraft instruments in the section headed "Periscopic Sextants."

The controller box 14 is a control panel type instrument, preferably mounted in a rack in the navigator's station in an aircraft. On the front of the instrument there is a crank handle 20 which permits the manual setting of a selected azimuth into the controller and a counter 21, also on the front instrument, indicates the value of the azimuth set into the controller by the knob 20. A knob 22 is provided for setting into the controller an azimuth rate change in degrees per hour. An "on" "off" switch 25 is also positioned on the front panel of the box 14.

The heading ring servo drive unit 13 (FIGURES 1, 5, 6 & 7 is located on the sextant mount 10, and secured thereon by clamps. Attached to the unit is a calibrating switch assembly 28 (FIGURE 1) mounted on an extensible cord and electrically connected with the unit through leads (not shown). This calibrating switch 28 is manually operated to correct the compass system in a manner to be discussed hereinafter and may, if desired, be clamped to the eye piece of the periscopic sextant.

Assumed heading to a chosen reference is received as an electrical analogue from a heading device such as that described in the aforementioned Wright copending application on conductor 30, and applied as a first input to a differential synchro 31. The azimuth of a selected celestial body on which a sight is to be made is obtained from navigational tables by the navigator, corrected to the chosen reference if necessary and manually set into the computer on the handle 20. The handle 20 is connected directly to a shaft 55 which passes through the computer and carries a gear 56a which meshes with a gear 56b on a shaft 57. The shaft 57 carries at its outer end a further gear 58 which meshes with gear 59 on the counter 21. Thus the celestial body azimuth set manually into the computer on the azimuth setting handle 20 is shown visually on the counter 21 where it can be read by the navigator. On the shaft 55 at the end remote from the azimuth setting handle 20 there is a gear and friction clutch 33 connected with the azimuth rate motor 35 through a compound gear 33a and gear 35a. The friction clutch 33 is of the variety which slips on application of high torque; thus the manual setting of the celestial body azimuth by the handle 20 is not transmitted to the azimuth rate motor 35. Intermediate of the gears 56a and the friction clutch 33 there is provided a worm 60 integral with the shaft 55. The worm 60 meshes with a worm gear 61 on transverse shaft 62, which shaft carries at its end a gear 63 which meshes with a gear 64 connected to the rotor of the differential synchro 31. Thus the azimuth setting input on handle 20 is applied as a second input to the differential 31.

The synchro differential transmitter 31 subtracts algebraically the analogue of assumed heading from the analogue of the celestial body azimuth set in by the handle 20. The operation of such synchro differential transmitters is in itself well known and thus the workings thereof need not be here described; suffice it to say that the algebraic subtraction produces an analogue signal of the assumed relative bearing of the selected celestial body, which signal is electrically transmitted on the line 36. When the "on" "off" switch 25 is in the "on" position this analogue signal of relative bearing is transmitted to synchro control transformer 37 in the servo drive unit 13. The control transformer 37, the amplifier 38 and the servo motor 39 form a closed feed back servo loop. Thus the error signal generated in the control transformer 37 is transmitted to the amplifier 38 which sends a signal to control the servo motor 39 to position the heading ring 11 relative to the fore and aft axis of the aircraft in accordance with the relative bearing signal from the differential synchro 31 in the control box 14. The pinioned shaft 39a of the motor 39 is mechanically connected through gear 70, shaft 71 and gears 72, 73, shaft 74, worm 75, worm gear 76, shaft 77, the end of which is pinioned to mesh with gear 78 on rotor 37a of the synchro control transformer 37 and turns the rotor 37a until the servo loop is balanced. On the end of the shaft 74 is a coupling 79 which by means of a coupling plate 80 couples to a mating coupling (not shown) mechanically connected to the heading ring. Rotation of the shaft 74 is transmitted through the coupling to rotate the heading ring. Thus the position of the reference index 12 (a notch or groove) on the heading ring is governed by the signal received by the controller transformer 37. The image of the zero reference index 12 is optically reflected to the eye piece of the periscopic sextant. This feature of optical reflection is inherent in the periscopic sextant mount of the Kollsman type No. 1708–01.

Now to calibrate the navigational system the navigator selects a celestial body on which to make a sight, refers to navigational tables and calculates therefrom the azimuth of the selected celestial body. By turning the handle 20 the navigator feeds into the differential synchro 31 the analogue of the azimuth of the selected celestial body and this is shown on the counter 21. At the same time the differential synchro 31 receives an electrical analogue of assumed aircraft heading from the heading device on line 30 (it is assumed of course that the switch 25 has been placed in the "on" position). The navigator now manually positions the periscopic sextant in its mount so that the sextant sighting cross hairs in the sextant eyepiece are aligned with the celestial body. If the system is correct, the reference index 12 on the heading ring 11, which by reflection appears in the sextant eyepiece, should appear in the sextant cross hairs which are aligned with the celestial body. If it does not, the navigator manually operates the calibrating switches 28 in either increased or decreased direction to move the ring until the image of the reference index 12 is brought into complete optical alignment with the sextant cross hairs, as viewed through the sextant eyepiece, when the latter is aligned with the selected celestial body. When the navigator operates either switch 28a or switch 28b of the calibrating switch assembly 28, a calibrating signal clockwise or anticlockwise in sense is transmitted on line 43 or 44 for the purpose of correcting the output signal from the heading device for example by precessing the compass reference element. Thus the differential synchro 31 receives a new first input. This causes the synchro 31 in its turn to transmit a new relative bearing to the synchro control transformer 37 and this emits an error signal which is amplified in amplifier 38 and transmitted to the servo motor 39, the motor 39 in its turn rotating the heading ring in clockwise or counterclockwise direction (depending upon whether switch 28a or 28b is operating) until the complete optical alignment discussed above is obtained in the eye piece of the sextant whereupon the navigator releases the switch.

At this time the output analogue from the heading device is the analogue of actual heading with respect to the celestial body and thus the heading system will be calibrated to indicate the correct direction in terms of the chosen reference.

The switches 28a and 28b of the manual calibrating switch 28 receive power through line 42 when the "on" "off" switch 25 is in the "on" position.

When the "on" "off" switch 25 is in the "off" position the power supply is transferred from the calibrating switch 28 to a remote station where, for example, the compass variation may be controlled. This interlock on the "on" "off" switch 25 infers that only either the servo drive unit 13 or the remote variation control station may be operational at one time.

The navigator may desire to make a number of sights on a selected celestial body in order to obtain an average. During the time taken for making these sights the selected celestial body will, of course, be changing in celestial azimuth. This change is due to the rotation of the earth compounded with movement of the aircraft across the surface of the earth. From reference to navigational tables the navigator obtains the azimuth of a selected celestial body at that moment and also the azimuth of the selected celestial body in, say, one hour from that time. The aircraft movement is also taken into account and from these figures the navigator arithmetically derives the rate of change of azimuth of the celestial body with respect to the moving aircraft. In order to compensate for this change in celestial azimuth an azimuth rate control motor 35 is provided for supplying to the computer an analogue of the rate of change of celestial body azimuth. The rate motor 35 is operated by the knob 22. The navigator, by turning this knob 22, positions the wiper 44 of a potentiometer 45 in the control box 14, and reads on a scale 46 the azimuth rate set in to the controller in terms of degrees per hour. The potentiometer has two sections 48 and 49 which are insulated from each other. The function of the potentiometer is similar to that of two separate potentiometers, one for increasing rate of change in celestial body azimuth by driving the motor in one direction, and one for decreasing the rate of change by driving the motor in the opposite direction. Each half 48 or 49 of potentiometer 45 is separately excited. The electrical signal taken off the potentiometer 45 by the wiper 44 drives the azimuth rate motor 35 in a clockwise or anticlockwise direction so that the shaft of the motor operates mechanically through compound gear 33a to transmit an analogue of rate of change of celestial body azimuth through the slip clutch 33, the shaft 55 and the mechanical connections 60, 61, 62, 63, 64 (FIGURE 3) to the differential synchro 31. This analogue signal forms a third input to the differential synchro 31 where it is added algebraically to the difference of the analogues of celestial body azimuth and assumed heading, and thus of course affects the signal on the line 36 to the synchro control transformer 37. Since the azimuth rate motor 35 is being driven continuously by the signal taken off from the potentiometer 45 the motor 39 will be constantly operated to drive the heading ring 11 of the sextant mount to keep pace with the change of celestial body azimuth during the sighting operations. The rotation of shaft 55 due to the input from the motor 35 is also transmitted through gears 56a, 56b, shaft 57 and gear 58 to the counter 21, thus the counter will show the instantaneous value of celestial body azimuth. If the navigator wishes to check the change of celestial body azimuth during the time elapsed whilst making a number of sights to obtain an average, he can, after making the sighting operations.

What I claim as my invention is:

1. A method of calibrating an aircraft heading system to a celestial reference, which comprises generating a heading output analogue signal corresponding to an assumed heading; generating an analogue of calculated azimuth of a selected celestial reference body; subtracting algebraically the first mentioned analogue and the second mentioned analogue whereby to produce as a further analogue signal the analogue signal of an assumed relative bearing of said celestial body to said aircraft; driving a heading ring in a sextant mount, which ring bears a zero index mark and is mounted to move independently of the sextant, in response to said further analogue signal to a position of said zero index mark relative to the axis of the aircraft corresponding to said assumed relative bearing; aligning said independently movable sextant with the actual bearing of said selected celestial reference body; and independently altering the calibration of the heading system to move the zero index mark of said indexed heading ring into optical alignment with said celestial reference body, whereby said first mentioned analogue becomes the analogue of the corrected heading of the aircraft, corrected by reference to said celestial reference body, thereby calibrating said heading system.

2. A method of calibrating an aircraft heading system to a celestial reference, which comprises generating a heading output analogue signal corresponding to an assumed heading; generating an analogue of calculated azimuth of a selected celestial reference body; generating an analogue, compatible with the first and second mentioned analogues of the rate of change of celestial body azimuth; algebraically subtracting the first two mentioned analogues and adding the third mentioned analogue whereby to produce as a further analogue signal, the analogue signal of assumed relative bearing of said celestial body to said aircraft, which further analogue signal is continuously corrected for the rate of change of celestial body azimuth; driving heading ring in a sextant mount, which ring bears a zero index mark and is mounted to move independently of the sextant in response to said further analogue signal to a constantly corrected position of said zero index mark relative to the axis of the aircraft corresponding to said assumed relative bearing; aligning the said independently movable sextant with the actual bearing of said selected celestial reference body; and independently altering the calibration of the heading system to move the zero index of the said indexed heading ring into optical alignment with said celestial reference body, whereby said first mentioned analogue becomes the analogue of the corrected heading of the aircraft corrected by reference to said celestial reference body, thereby calibrating said heading system.

3. Apparatus, for cooperation with a sextant manually movable with respect both to a sextant mount and a zero indexed heading ring mounted on the sextant mount and rotatable relative to the mount, for calibrating an aircraft heading system having means for generating an analogue signal of assumed aircraft heading comprising differential means adapted to receive as a first input the analogue signal of assumed aircraft heading; means for setting into the differential means as a second input the analogue of the calculated azimuth of a selected celestial body; a feed back servo loop including a servo motor adapted to drive said zero indexed heading ring in response to an output analogue signal from said differential means; and means manually operable to transmit a calibrating signal to the heading system thereby altering the output signal from the differential whereby to move the zero index on said heading ring independently of the said sextant into optical alignment with said celestial body thereby calibrating the heading system.

4. Apparatus as claimed in claim 3 wherein the means operable to alter the calibration of said directional system comprises calibrating switch means electrically connected to said heading system.

5. Apparatus, for cooperation with a sextant manually movable with respect both to a sextant mount and a zero indexed heading ring mounted on the sextant mount and rotatable relative to the mount, for calibrating an aircraft heading system having means for generating an analogue signal of assumed aircraft heading, comprising differential means adapted to receive as a first input the analogue signal of assumed aircraft heading; means for setting into the differential means as a second input the analogue of the calculated azimuth of a selected celestial body; means for setting into the differential means as a third input the analogue of the rate of change of azimuth of the selected celestial body; a feed back servo loop including a servo motor adapted to drive said zero indexed heading ring in response to an output analogue signal from said differential means; and calibrating switch means manually operable to transmit a calibrating signal to the heading system thereby altering the output signal from the differential whereby to move the zero index on said heading ring independently of the said sextant into optical alignment with said celestial body thereby calibrating said heading system.

6. Apparatus, for cooperation with a sextant manually movable with respect both to a sextant mount and a zero indexed heading ring mounted on the sextant mount and rotatable relative to the mount, for calibrating an aircraft heading system including a directional reference element and means for generating an analogue signal of assumed true aircraft heading, comprising a differential synchro adapted to receive as a first input the electrical analogue signal of assumed true aircraft heading; mechanical means for setting into the differential means as a second input the analogue of azimuth of a selected celestial body in the form of a shaft rotation; a rate motor mechanically coupled with said differential synchro and adapted to set in thereto as a third input the mechanical analogue of the rate of change of azimuth of the selected celestial body; a feed back servo loop comprising a synchro control transformer, an amplifier and a servo motor, mechanical connections between said motor and said index heading ring, said synchro control transformer being electrically connected to receive an output analogue signal from said differential synchro to control the position of said indexed heading ring independently of the said sextant; calibrating switch means electrically connected to the heading system and operable to transmit a calibrating signal to the means for generating a signal of assumed true heading whereby to alter the output signal from the differential synchro and thereby move the zero index on said heading ring independently of the said sextant into optical alignment with said celestial body thereby calibrating said heading system.

7. Apparatus, for cooperation with a sextant manually movable with respect both to a sextant mount and a zero indexed heading ring mounted on the sextant mount and rotatable relative to the mount, for calibrating an aircraft heading system including a directional gyro and means for generating an analogue signal of assumed true aircraft heading, comprising a differential synchro adapted to receive as a first input an electrical analogue of assumed true aircraft heading; mechanical means for setting into the differential synchro as a second input the analogue of azimuth of a selected celestial body in the form of a shaft rotation; a rate motor mechanically coupled with said differential synchro and adapted to set in thereto as a third input the mechanical analogue of the rate of change of azimuth of the selected celestial body; potentiometer means for controlling the speed of said rate motor; a feed back servo loop comprising a synchro control transformer, an amplifier, and a servo motor, mechanical connections between said motor and said index heading ring, said synchro control transformer being electrically connected to receive an analogue signal from said differential synchro to control the position of said indexed heading ring independently of the said sextant; calibrating switch means electrically connected to said directional reference element and operable to vary the calibration of said directional gyro whereby to move the zero index on said heading ring independently from said sextant into optical alignment with said celestial body thereby calibrating said heading system.

8. Apparatus, for cooperation with a sextant manually movable with respect both to a sextant mount and a zero indexed heading ring mounted on the sextant mount and rotatable relative to the mount, for calibrating an aircraft heading system including a directional gyroscope and a means for generating an analogue signal of assumed aircraft heading comprising: a differential synchro adapted to receive as a first input an electrical analogue of assumed true aircraft heading; a shaft, means for rotating said shaft, mechanical connections between said shaft and said differential synchro for setting into said synchro as a second input thereto the mechanical analogue of azimuth of a selected celestial body; a counter, mechanical connections between said shaft and said counter, said counter being adapted to indicate visually the value of the mechanical analogue input of celestial body azimuth to said differential synchro; a rate motor; potentiometer means for controlling the speed of said rate motor; mechanical connections between said rate motor and said shaft including a slipping friction clutch, said rate motor being adapted to transmit through said mechanical connections to said shaft and thence to said differential synchro a mechanical analogue of the rate of change of celestial body azimuth; a feed back servo loop comprising a synchro control transformer, an amplifier and a servo motor; mechanical connections between said motor and said indexed heading ring, said synchro control transformer being electrically connected to receive an analogue output signal from said differential synchro to control the position of said indexed heading ring independently of the said sextant; compass calibrating switch means electrically connected to said directional element and operable to vary the calibration of said directional gyroscope whereby to move the zero index on said heading ring independently of the said sextant into optical alignment with said celestial body thereby calibrating said heading system.

References Cited by the Examiner

UNITED STATES PATENTS

| | | | |
|---|---|---|---|
| 2,554,010 | 5/1951 | Carbonara et al. | 33—69 |
| 2,882,602 | 4/1959 | Gray et al. | 33—46 |
| 2,894,330 | 7/1959 | Carbonara | 33—61 |
| 2,922,224 | 1/1960 | Gray | 33—1 |

ROBERT B. HULL, *Primary Examiner.*